United States Patent Office 3,642,832
Patented Feb. 15, 1972

3,642,832
EPOXIDE PREPARATION
Richard Denis Smetana, Beacon, Harry Chafetz, Poughkeepsie, and Alfred Arkell, Wappingers Falls, N.Y., assignors to Texaco Inc., New York, N.Y.
No Drawing. Filed Mar. 18, 1969, Ser. No. 808,347
Int. Cl. C07d 1/08, 1/12
U.S. Cl. 260—348.5 L         5 Claims

ABSTRACT OF THE DISCLOSURE

A method of producing an epoxide of the formula:

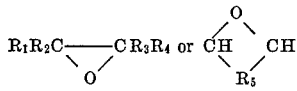

where $R_1$, $R_2$, $R_3$ and $R_4$ are hydrogen or hydrocarbyl and $R_5$ is α,Ω-alkylene comprising contacting a first olefin of the formula:

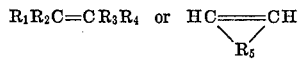

where $R_1$ through $R_5$ is as heretofore defined with an alkoxyhydroperoxide of the formula:

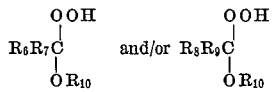

where $R_6$, $R_7$, $R_8$ and $R_9$ are hydrogen or hydrocarbyl in the presence of a molybdenum, tungsten or vanadium epoxide producing catalyst, said hydroperoxide prepared by contacting a mixture of a second olefin of the formula:

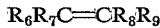

where $R_6$, $R_7$, $R_8$ and $R_9$ are as heretofore defined, and an alkanol of the formula $R_{10}OH$ where $R_{10}$ is alkyl with ozone.

BACKGROUND OF INVENTION

In the past, a standard means of preparing epoxides of the type contemplated herein was by contacting unsaturated alkenes, cycloalkenes and their substituted derivatives with peroxy compounds such as peracetic, perbenzoic and monoperphthalic acid. Although this past reaction does produce epoxides, it has the limited applicability since it is not entirely satisfactory in respect to selectivity and yield of epoxide product.

SUMMARY OF INVENTION

We have discovered a method which is highly selective to the production of epoxides from their unsaturated precursors and alkoxyhydroperoxides. In addition, the method of the invention produces epoxides in yields more attractive from a commercial standpoint than many of the prior art methods.

Particularly, our method comprises contacting a first olefin of the formula:

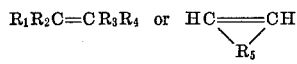

where $R_1$, $R_2$, $R_3$ and $R_4$ are hydrogen or alkyl, aryl, alkylaryl or arylalkyl of from 1 to 40 carbons with an alkoxyhydroperoxide of the formula:

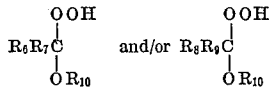

where $R_6$, $R_7$, $R_8$ and $R_9$ are hydrogen or alkyl, aryl, alkylaryl or arylalkyl of from 1 to 40 carbons in the presence of a molybdenum, tungsten or vanadium epoxide producing catalyst, said hydroperoxide being prepared by contacting with ozone a second olefin of the formula $R_6R_7C=CR_8R_9$ in the presence of an alkanol of the formula $R_{10}OH$ where $R_{10}$ contains from 1 to 20 carbons.

DETAILED DESCRIPTION OF THE INVENTION

More specifically, the method of the invention comprises preparing an epoxide comprising contacting a first olefin with an alkoxyhydroperoxide in the presence of between about 0.01 and 10 wt. percent based on the reaction mixture of a catalyst, all as heretofore defined, utilizing a mole ratio of first olefin to alkoxyhydroperoxide of between about 1:1 and 100:1 at a temperature between about 0 and 200° C. under pressure ranging from 1 to 100 atmospheres.

If needed to facilitate contact of reactants and catalysts, inert nonpolar liquid solvent may be employed. This solvent can be derived from carryover of the solvent or alcohol reactant employed in the preparation of the hydroperoxide reactant or from freshly added solvent. If solvent is employed, normally the solvent quantities are between about 50 and 95 wt. percent based on the reaction mixture utilized. To additionally facilitate contact, agitation is desirably employed, such as stirring, particularly when one of the ingredients such as catalyst is insoluble in the reaction medium.

Recovery of the epoxide product is accomplished by standard means such as filtration to remove solids such as catalyst followed by fractional distillation to recover the epoxide as overhead or residue depending on its relative boiling point in respect to the boiling points of the remaining reaction medium ingredients.

In regard to the alkoxyhydroperoxide reactant it is prepared by contacting an admixture of a second olefin as heretofore defined with ozone in the presence of the aforedefined alkanol at a temperature between about −100 and 100° C. utilizing a mole ratio of olefin to ozone of between about 1:1 and 20:1 and a mole ratio of olefin to alcohol between about 1:20 and 20:1. The formed alkoxyhydroperoxide can be isolated by standard means such as removing the excess alcohol, if present, via vacuum distillation leaving the alkoxyhydroperoxide as residue for addition to the olefin catalyst mixture in the epoxide preparation.

If needed to facilitate contact in the hydroperoxide preparation, inert solvent and/or agitation can be employed in the manner and quantities described in respect to the epoxide formation. Suitable examples of inert solvents that may be employed, if required, in either hydroperoxide or epoxide preparation, are the liquid paraffins, halogenated paraffins and dialkyl ethers such as chloroform, methylene chloride, pentane and diethyl ether. Solvent quantities of between about 80 and 99 wt. percent of the reaction mixture are utilized under advantageous conditions.

The preparation of the alkoxyhydroperoxide reactant and epoxide product are further described by the following chemical equations:

(1) Hydroperoxide preparation

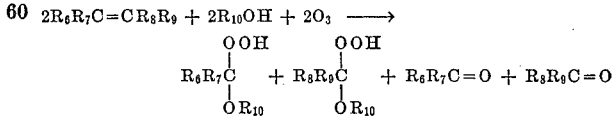

(2) Epoxide preparation

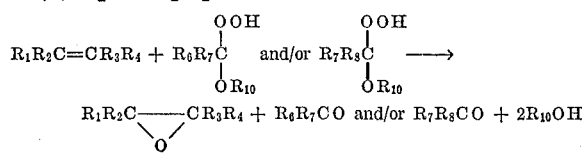

Examples of the olefin reactant contemplated herein are those characterized by the formulas $R_1R_2C=CR_3R_4$ having 5 to 12 carbons and

having 6 to 8 carbons such as 1-pentene, 2-pentene, 1-hexene, 1-octene, 2-octene, cyclohexene, cyclooctene, alpha-methylstyrene, 2-methyl - 1 - pentene, 3-(3'-ethylphenyl)-1-propene; ortho-, meta-, and para-isopropenylcumene and diisopropenylbenzene; and 1-phenylcyclohexene.

Examples of the alkanol reactants contemplated herein are methanol, ethanol, n-butanol, hexanol, t-butanol and 3-octanol.

Specific examples of alkoxy hydroperoxide intermediates are those characterized by the formula:

where $R_x$ and $R_y$ total from 0 to 7 carbons and $R_{10}$ is from 1 to 8 carbons such as a mixture of 1-methoxyheptyl hydroperoxide and 1-methoxymethyl hydroperoxide derived from the reaction of methanol and 1-octene; a mixture of 1-methoxyhexyl hydroperoxide and 1-methoxyethyl hydroperoxide derived from the reaction of methanol and 2-octene; and a mixture of 1-propoxy-1-phenylethyl hydroperoxide and 1-propoxymethyl hydroperoxide derived from a reaction of α-methylstyrene and 1-propanol.

Examples of the epoxide products produced in the method of the invention are those characterized by the formula

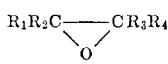

having from 5 to 12 carbons and

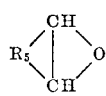

having from 6 to 8 carbons such as 1,2-octene oxide; 2,3-octene oxide; 2-methyl-1,2-pentene oxide; 1,2-cyclooctene oxide; 1,2-cyclohexene oxide and 2-methyl-2-phenyl-1,2-ethylene oxide are respectively formed from 1-octene, 2-octene, 2-methyl-1-pentene, cyclooctene, cyclohexene and alpha-methylstyrene.

Examples of the transitional metal epoxide producing catalysts contemplated herein are molybdenum hexacarbonyl, molybdenum trioxide, molybdenum dioxide, sodium molybdate, molybdenum oxyacetylacetonate, sodium phospho-12-molybdate, sodium phospho-18-molybdate, phosphomolybdic acid, molybdenum sulfide, silicomolybdic acid, molybdenum pentachloride, ethylphosphomolybdate and tungsten and vanadium counterparts such as sodium tungstate, sodium vanadate and vanadium pentoxide.

The following examples further illustrate the method of the invention but are not to be construed as limitations thereof.

Example I

This example illustrates the preparation of the alkoxyhydroperoxide reactant.

To a 250 ml., 3-neck flask equipped with a gas sparger, a thermometer, a water condenser and magnetic stirrer, there was charged 200 millimoles of alpha-methylstyrene dissolved in 100 ml. of methanol. Ozone of a content of 3.9 mole percent in admixture with air was passed through the solution maintained at −25° to −50° C. at a rate of 600 mls./minute over a 220 minute period and until a total of 20 millimoles of ozone were absorbed, that is, until the blue color or ozone appeared in the reaction mixture indicating complete reaction of the olefin. The excess methanol was removed by vacuum distillation leaving 45.5 grams of residual mixture containing 1-methoxymethyl hydroperoxide and 1-methoxy-1-phenylethyl hydroperoxide.

EXAMPLE II

This example illustrates the preparation of the epoxide from the olefin-alkoxyalkyl hydroperoxide.

A 6.76 g. portion of the hydroperoxide mixture produced in Example I was added to a 100 ml. 1-neck pyrex flask containing a magnetic stirring bar, a calcium sulfate containing drying tube and the olefin and catalyst. At the end of the reaction the final product was analyzed via gas chromatography. Three runs were conducted. The reaction data and results are reported below in Table I:

TABLE I.—REACTION DATA AND RESULTS

| Run | A | B | C |
|---|---|---|---|
| Reactant and cat. (millimoles): | | | |
| 1-octene | 243 | | |
| Cyclohexene | | 362 | |
| Cyclooctene | | | 275 |
| Hydroperoxide [a] | 30.2 | 27.3 | 27.6 |
| MoO$_3$ | 1 | 1 | 1 |
| Reaction conditions: | | | |
| Temperature, °C | 102 | 73 | 93 |
| Percent unreacted hydroperoxide after 4 hours | 14 | 9 | 2 |
| Product yield, mole percent [b]: | | | |
| 1,2-octene oxide | 14 | | |
| 1,2-cyclohexene oxide | | 24 | |
| 1,2-cyclooctene oxide | | | 90 |

[a] Mixture containing 1-methoxy-1-phenylethyl hydroperoxide and 1-methoxymethyl hydroperoxide.
[b] Based on hydroperoxide.

We claim:
1. A method of preparing an epoxide of the formula:

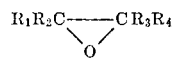

having 5 to 12 carbons and

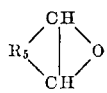

having 6 to 8 carbons, comprising contacting an olefin of the formula:

$$R_1R_2C=CR_3R_4$$

having 5 to 12 carbons or

having 6 to 8 carbons with an alkoxy hydroperoxide of the formula:

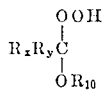

where $R_1$, $R_2$, $R_3$, $R_4$, $R_x$ and $R_y$ are hydrogen, alkyl, aryl, alkylaryl or arylalkyl, $R_5$ is α,Ω alkylene, $R_{10}$ is alkyl of from 1 to 8 carbons and $R_x$ plus $R_y$ total from 0 to 7 carbons in the presence of a molybdenum, tungsten or vanadium epoxidation catalyst at a temperature between about 0 and 200° C. utilizing a mole ration of olefin to hydroperoxide of between about 1.1 and 100:1, said catalyst being present in an amount between about 0.1 and 10 wt. percent based on the reaction mixture.

2. A method in accordance with claim 1 wherein said alkoxy hydroperoxide is a mixture of 1-methoxy-1-phenylethyl hydroperoxide and 1-methoxymethyl hydroperoxide and said catalyst is molybdenum trioxide.

3. A method in accordance with claim 2 wherein said olefin is 1-octene and said epoxide is 1,2-octene oxide.

4. A method in accordance with claim 2 wherein said olefin is cyclohexene and said epoxide is 1,2-cyclohexene oxide.

5. A method in accordance with claim 2 wherein said olefin is cyclooctene and said epoxide is 1,2-cyclooctene oxide.

No references cited.

NORMA S. MILESTONE, Primary Examiner

U.S. Cl. X.R.

260—592, 593 A, 595, 604 R, 610 R